US006900430B2

(12) United States Patent
Okumura et al.

(10) Patent No.: US 6,900,430 B2
(45) Date of Patent: May 31, 2005

(54) MASS SPECTROMETER AND MEASUREMENT SYSTEM USING THE MASS SPECTROMETER

(75) Inventors: Akihiko Okumura, Hachioji (JP); Atsumu Hirabayashi, Kodaira (JP); Izumi Waki, Asaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/153,615

(22) Filed: May 24, 2002

(65) Prior Publication Data

US 2003/0066958 A1 Apr. 10, 2003

(30) Foreign Application Priority Data

Oct. 10, 2001 (JP) .................................... 2000-312118

(51) Int. Cl.[7] .......................... G01N 30/72; H01J 49/34

(52) U.S. Cl. ........................ 250/281; 250/287; 250/292

(58) Field of Search ................................ 250/280, 287, 250/282, 290, 394, 299, 293, 294, 296, 300, 292, 281, 283, 285, 288, 289; 435/7.1

(56) References Cited

U.S. PATENT DOCUMENTS 6,011,259 A 1/2000 Whitehouse et al.
6,020,586 A * 2/2000 Dresch et al. .............. 250/287
6,541,769 B1 * 4/2003 Nabeshima et al. ........ 250/290
6,570,151 B1 * 5/2003 Grosshans et al. .......... 250/282
6,570,152 B1 * 5/2003 Hoyes ........................ 250/287
6,770,872 B2 * 8/2004 Bateman et al. ............ 250/281
6,794,640 B2 * 9/2004 Bateman et al. ............ 250/281
2002/0119490 A1 * 8/2002 Aebersold et al. ........... 435/7.1
2002/0175292 A1 * 11/2002 Whitehouse et al. ....... 250/394

FOREIGN PATENT DOCUMENTS

JP 57030255 A * 2/1982 ............ H01J/49/26

OTHER PUBLICATIONS

C. Marinach, A. Brunot, C. Beaugrand, G. Bolbach, J.C. Tabet, "Optimization of Orthogonal Tandem Ion Trap./reTOF/MS", Proceedings of the 49$^{th}$ ASMS Conference on Mass Spectrometry and Allied Topics, Chicago, Illinois, May 27–31, 2001, pp. 1–2.

Benjamin M. Chien, Steven M. Michael and David M. Lubman, "Enhancement of Resolution in Matrix–assisted Laser Desorption Using an Ion–trap Storage/Reflectron Time–of–flight Mass Spectrometer", Rapid Communications in Mass Spectrometry, vol. 7 (1993) pp. 837–843.

* cited by examiner

*Primary Examiner*—Jack I. Berman
(74) *Attorney, Agent, or Firm*—Reed Smith LLP; Stanley P. Fisher, Esq.; Juan Carlos A. Marquez, Esq.

(57) ABSTRACT

A practical mass spectrometer for proteome analysis is provided. In an ion trap-connected, orthogonal acceleration type time-of-flight mass spectrometer, the mass-to-charge ratio range that may be analyzed by one procedure is increased by providing means for reducing the velocity of ions ejected from an ion trap. The efficiency in protein identification in proteome analysis is thereby improved.

10 Claims, 8 Drawing Sheets

MASS SPECTROMETER AND MEASUREMENT SYSTEM USING THE MASS SPECTROMETER

CLAIM OF PRIORITY

This application claims priority to Japanese Patent Application No. 2001-312118 filed on Oct. 10, 2001.

BACKGROUND OF THE INVENTION

1. Field of the Invention

The present invention relates to a time-of-flight mass spectrometer with an ion trap bound thereto and, more particularly, to a mass spectrometer for proteome analysis.

2. Description of the Background

In the field of proteome analysis, the so-called "shotgun method" is in wide use, which comprises decomposing a protein mixture extracted from cells with a digestive enzyme, separating the fragment peptides obtained using a liquid chromatograph, selecting, within a mass spectrometer, one peptide species and decomposing this by collision-induced dissociation (CID), determining the molecular weights of the resulting fragments from a mass spectrum of the fragments, and identifying the original protein by checking against a genome database. The technique comprising selecting and decomposing one ion species within a mass spectrometer and subjecting the fragments to mass spectrometry is generally called "MS/MS analysis." In some kinds of mass spectrometers, it is possible to select one fragment among the fragments resulting from MS/MS analysis and further subjecting that fragment to MS/MS. It is also possible to repeat such sequence n times, and this technique is generally called "MSn analysis."

A quadrupole ion trap mass spectrometer (ITMS) can perform MSn analysis where n is not less than 3, and is characterized in that high levels of sensitivity and efficiency can be attained because CID is performed after accumulation of ions in the ion trap. In proteome analysis, however, mass-to-charge ratio ranges of up to about 3,000 and a mass resolution of at least about 5,000 are desired, whereas the conventional ion trap mass spectrometers are generally about 2,000 in mass-to-charge ratio and in mass resolution and have a decreased mass accuracy. Hence, the range of application of conventional ITMS is limited, and only low protein identification efficiency can be secured with such apparatuses.

In B. M. Chien, S. M. Michael and D. M. Lubman, *Rapid Commun. Mass Spectrom.* Vol.7 (1993) 837, there is disclosed a mass spectrometer comprising a quadrupole ion trap and a time-of-flight mass spectrometer (TOFMS) that are coaxially combined. When this apparatus is used, it is possible to perform MSn analysis (n being not less than 3) at high levels of mass-to-charge ratio ranges and mass accuracy using the TOFMS.

However, because, in this apparatus, the ion trap and the TOFMS are combined coaxially and the ion trap also serves as an accelerator for the TOFMS, a collision of ions with the neutral gas for CID occurs frequently during acceleration. The ions are thereby scattered and, as a result, it is difficult to attain a high level of resolution. However, when the acceleration voltage is increased, it becomes possible to eject ions in a shorter time and to thereby reduce the scattering thereof. Hence, the resolution may be improved, but there arises the problem that the collision energy increases and, as a result, ions are readily decomposed. When ions are decomposed during acceleration, chemical noises are produced, whereby the lower detection limit is deteriorated.

In the mass spectrometer described in U.S. Pat. No. 6,011,259, CID is effected in a multi-pole ion guide, and the resulting ions are discharged from the ion guide and analyzed in a TOFMS of the orthogonal accelerator type. Because the orthogonal accelerator can be disposed in a high vacuum region, the frequency of collisions with a neutral gas during acceleration is substantially negligible. Generally, the efficiency of CID in a multi-pole ion guide is lower as compared with ion traps. However, the CID efficiency can be improved to some extent by causing the ion guide to function as a two-dimensional ion trap (also called a linear trap).

However, the space distribution and energy distribution of ions relative to the axial direction of the ion guide are large, and, therefore, the ions accelerated are dispersed. As a result, there arises the problem that the detection sensitivity is low. Unlike the quadrupole ion trap, the linear trap cannot be used in MSn where n is not less than 3.

In C. Marinach, A. Brunot, C. Beaugrand, G. Bolbach, J. C. Tabet, *Proceedings of the* 49*th* *ASMS Conference on Mass Spectrometry and Allied Topics*, Chicago, Ill., May 27–31, 2001, there is disclosed a mass spectrometer in which a quadrupole ion trap and a TOFMS are combined off axis. In this apparatus, ions are initially ejected from the ion trap, then accelerated in a direction perpendicular to the axis of the ion trap, and finally subjected to analysis on the TOFMS. In this apparatus, ions spatially focused in the middle of the ion trap are dispersed as far as possible relative to the axial direction during transfer thereof from the ion trap to the orthogonal accelerator. This causes the ions to form a continuous ion flow while an acceleration voltage pulse is continuously applied at spaced intervals (i.e., repeated pulses) to perform analysis on the TOFMS. Since ions spatially and energetically focused within the ion trap are converted to a continuous ion flow, there arises, as a result, the same problems as with the apparatus described above with reference to U.S. Pat. No. 6,011,259.

As discussed above, the prior art mass spectrometers are characterized in that it is difficult to simultaneously attain broad mass-to-charge ratio ranges and high mass resolution with sufficient detection sensitivity.

SUMMARY OF THE INVENTION

The present invention preferably addresses the above limitations by providing a mass spectrometer that combines an ion trap with a TOFMS of the orthogonal acceleration type. In the mass spectrometer according to the present invention, the ions ejected from the ion trap are transferred to the orthogonal accelerator, and an acceleration voltage is applied thereto in the transverse direction relative to the direction of ion flow. According to the invention, the mass-to-charge ranges are controlled by setting the time from ion ejection from the ion trap to acceleration voltage pulse application at predetermined values.

As a means for ejecting ions from the ion trap, an accelerating electric field may be formed within the ion trap after stopping the application of an RF voltage for accumulating ions. When an accelerating electric field is formed under application of an RF voltage, the spatial distribution of ions within the ion trap, the kinetic energy distribution among ions within the ion trap, and the spatial distribution of ions in the acceleration region due to impact scattering by collision with natural gases increase. The conventional methods mentioned above do not produce such increasing effects.

Even when the above-mentioned means for ejecting ions is provided, the initial voltage at which ions are ejected varies according to the initial location of ions. Those ions located on the remote side of the ion trap from the outlet are ejected later than the ions occurring on the side closer to the outlet. Because, however, the velocity of the former is higher than the ions occurring on the side closer to the outlet, the former ions pass the latter at a certain location. This location is called the "space focal plane." By forming an electric field for accelerating ions in the direction of movement thereof between the ion trap outlet and the orthogonal accelerator, it is possible to adjust the position of the space focal plane according to the well-known principle of multi-stage acceleration. By optimizing the position of the space focal plane according to this principle, it becomes possible to improve the efficiency of detection of ions occurring in the acceleration region boundary.

Further, means may be provided for reducing the velocity distribution of ions during transfer thereof from the ion trap to the orthogonal accelerator. The means for reducing the velocity distribution of ions may be disposed within the ion trap or outside of the same.

Ions ejected from the ion trap arrive at the orthogonal accelerator at different times according to their mass-to-charge ratios (m/z), and only those ions that are in the acceleration region at the time of acceleration voltage application (pulsing) are accelerated in the orthogonal accelerator and sent to the detector. That is, the range of mass-to-charge ratios of ions analyzed by a single pulse in the ion trap is restricted by the length of the orthogonal accelerator and the length of the detector, among others. Therefore, the mass-to-charge ratio range which may be analyzed at a single time is physically limited. Although the mass-to-charge ratio range may be broadened by increasing the length of the orthogonal accelerator, the ion beam spreading in the acceleration region then increases, and it becomes difficult to realize a high resolution over the entire range. It is also necessary to increase the size of the detector corresponding to the length of the acceleration region. However, the detector may be expensive, and the cost thereof largely depends on the size of the detector.

By providing means for reducing the velocity distribution of the ions entering the acceleration region, it is possible to broaden the mass-to-charge ratio range analyzable by one process of ion accumulation in the ion trap. Such extension of the mass-to-charge ratio range is useful in proteome analysis, in particular.

Specific means available for reducing the ion velocity distribution in the axial direction include: (1) increasing the acceleration electric field during the period until ions are ejected from the ion trap; or (2) varying the electric field in the region from the ion trap outlet to the orthogonal accelerator inlet, or in a part of that region after ion ejection from the ion trap.

Other means for enlarging the mass-to-charge ratio range than the reduction of the ion velocity distribution include techniques comprising: (3) dividing the mass-to-charge ratio range to be analyzed into a plurality of ranges, analyzing each divided region, and combining the data thus obtained; or (4) analyzing those ions in a low mass-to-charge ratio range among the ions accumulated in the ion trap by ion trap mass spectrometry and analyzing the remaining ions using a TOFMS of the orthogonal acceleration type. By combining the ion trap and an orthogonal acceleration type TOFMS, it is possible to further enlarge the mass-to-charge ratio range.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

First Exemplary Embodiment

Figure 1:
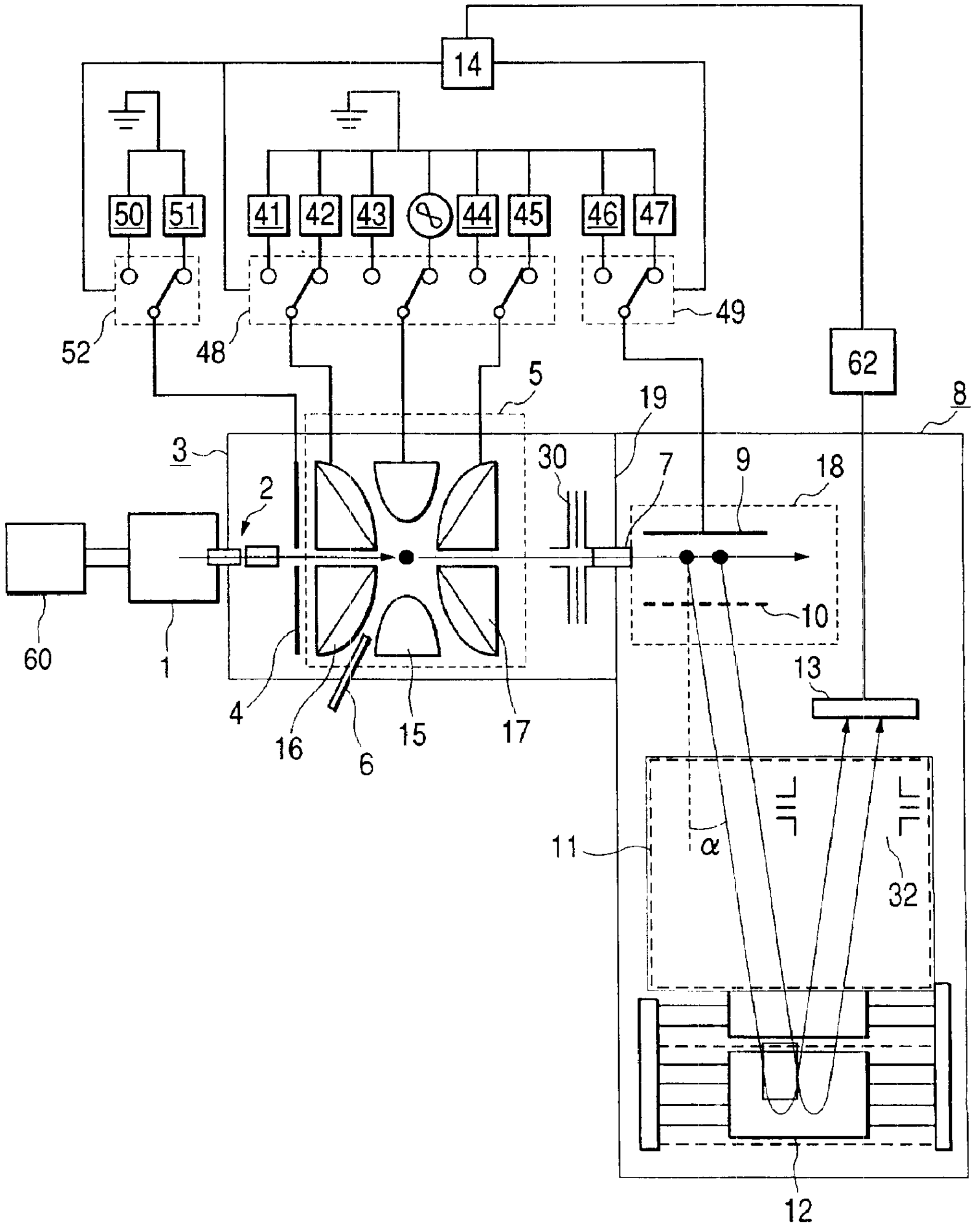
FIG. 1 shows the constitution of a mass spectrometer according to the present invention.

FIG. 1 shows a mass spectrometer according to the present invention and a measurement system using the same. Taking proteome analysis as an example, the apparatus and measurement system according to the invention are described below. This analysis example is a proteome analysis example concerning a species of organism for which genome decipherment has been completed, and it is an example of the so-called shotgun method.

According to the shotgun method, the molecular weights of partial fragments of proteins are determined by mass spectrometry, and the original proteins are identified by checking a database for amino acid sequences translated from genomic base sequences. Initially, a protein mixture extraction from cells is decomposed with a digestive enzyme, or the like, to give a peptide mixture. A sample solution containing the resulting peptide mixture is loaded into the injector of a liquid chromatograph (LC) 60 and injected into the LC flow channel. The peptide mixture in the sample is separated into molecular species according to the molecular weight during passage through the separation column, and those species arrive one by one at the electrospray (ESI) ion source 1 connected to the LC flow channel terminus in about several minutes to several hours after sample injection. The ion source 1 is not limited to the ESI. The ion source 1 is always in operation, and the peptide fragments that have arrived at the ion source are ionized in order of arrival.

The ions formed are introduced into the mass spectrometer through the aperture 2, then pass through the gate electrode 4 and enter the ion trap 5 disposed within a first vacuum region 3. 50 and 51 are power supplies connected to the gate electrode 4. The ion trap 5 is comprised of a ring electrode 15 and two endcap electrodes 16 and 17. The ring electrode 15 is connected with a DC power supply 43 and a high-frequency (AC) power supply, and the endcap electrodes 16 and 17 are connected with DC power supplies 41, 44 and high frequency (AC) power supplies 42, 45, each via a switch 48, respectively. The switching (on-and-off) timing of the switch 48 is controlled by a controller 14. In FIG. 1, there is shown a gas supply pipe 6; in principle, however, this is unnecessary.

In accumulating ions, a high-frequency voltage is applied to the ring electrode 15, while the two endcap electrodes 16, 17 are grounded. By this, a quadrupole electric field is formed within the ion trap 5 and can entrap those ions not lower in mass-to-charge ratio (m/z) than that corresponding to the amplitude of the high-frequency voltage among the incoming ions. After about 1 to 100 ms of ion accumulation in that manner, the voltage of the gate electrode 4 is changed (via switch 52) to thereby stop ions from entering the ion trap. In this state, the ions entrapped are stabilized for about 0 to 10 ms.

Thereafter, the high-frequency voltage application to the ring electrode 15 is discontinued and, immediately thereafter, a DC voltage of about 0 to 100 V is applied to the ring electrode 15 and two endcap electrodes 16, 17 (rise time about 10–100 ns) to thereby form an acceleration electric field within the ion trap 5. The accelerated ions are discharged from the ion trap 5 and pass through the pinhole 7, which is grounded. The kinetic energy of an ion in the axial direction of the ion trap after passage through the pinhole 7 is determined by the potential Vtrap in the central part of the ion trap 5 but does not depend on the mass number of the ion.

The ion that has passed through the pinhole 7 flies at a velocity v determined by $(M/z)\cdot v^2=2$ eVtrap and passes through the orthogonal accelerator 18. Here, M is the mass of the ion, z is the valence of the ion, and e is the elementary electric charge. Therefore, an ion smaller in m/z arrives at the accelerator 18 earlier.

The orthogonal accelerator 18 is comprised of two parallel plate electrodes 9 and 10 and is disposed in a second vacuum region 8. While the orthogonal accelerator 18 is filled with ions, the two electrodes 9, 10 are grounded and, after completion of ion filling, a high-voltage pulse is applied to the acceleration electrode 9 (rise time 10 to 100 ns). The electrode 10 is in a mesh form for allowing passage of ions, with the periphery being in a plate form, and the outward form thereof is almost equal to that of the electrode 9. Therefore, the ions that have entered the orthogonal accelerator 18 after application of the acceleration voltage to the acceleration electrode 9 are immediately accelerated and collide against the periphery of the electrode 10 but do not arrive at the detector. The ions that have passed through the meshed portion of the electrode 10 fly through the electric field-free drift space 11 and enter the reflectron 12 and are inverted within the reflectron and again fly through the drift space and enter the MCP detector 13. The use of the reflectron 12 is advantageous in that the time divergence due to the spatial spreading (in the direction of acceleration) of ions in the orthogonal accelerator 18 can thereby be focused to improve the resolving power and in that the apparatus can be made smaller. By dividing the orthogonal accelerator 18 into two acceleration electric field stages and adjusting the space focal plane using the principle of two-stage acceleration, it is possible to optimize the focusing effect of the reflectron 12.

The flying direction of ions that have entered the drift space 11 has a certain angle $\alpha$ relative to the direction of the acceleration electric field. The angle $\alpha$ of ion flight depends upon Vtrap and the initial voltage Vacc within the orthogonal accelerator 18, but does not depend on m/z. Therefore, for detecting all ions that are accelerated, the detector used should be at least equivalent in length to the acceleration region. The magnitudes of Vtrap and Vacc are, for example, 20 V and 7.5 kV, respectively, and $\alpha$ is about 3 degrees.

When, in the above case, ion trajectories are focused by using an electrostatic lens 30, the detector 13 can be made smaller in size. At the same time, by disposing the electrostatic lens 30 between the ion trap outlet and the pinhole 7, it is possible to increase the amount of ions passing through the pinhole and to improve the detection sensitivity. At the same time, the spreading of ion beams can be suppressed, and the resolution can be improved. By switching the switches 48, 49 and 52, the controller 14 controls the magnitudes of the voltage to be applied to the gate electrode 4, ring electrode 15, endcap electrodes 16, 17 and orthogonal accelerator 18 as well as the timings of application thereof.

The time from ion ejection from the ion trap 15 to the application of a pulse voltage to the orthogonal accelerator 18 is controlled by a delay circuit disposed within the controller 14. The relationship between the delay time and the m/z range of ions to be detected is determined by the electrode disposition from the ion trap 5 to the orthogonal accelerator 18 and by each electrode potential in transferring ions from the ion trap to the orthogonal accelerator 18. Therefore, the delay time is determined in advance according to the m/z range of ions to be detected. The controller 62 is superior to the controller 14 and interlocks the timing of starting measurement by the detector 13, the operational control of the orthogonal accelerator 18 by the controller 14, and other similar operations.

Figure 2:
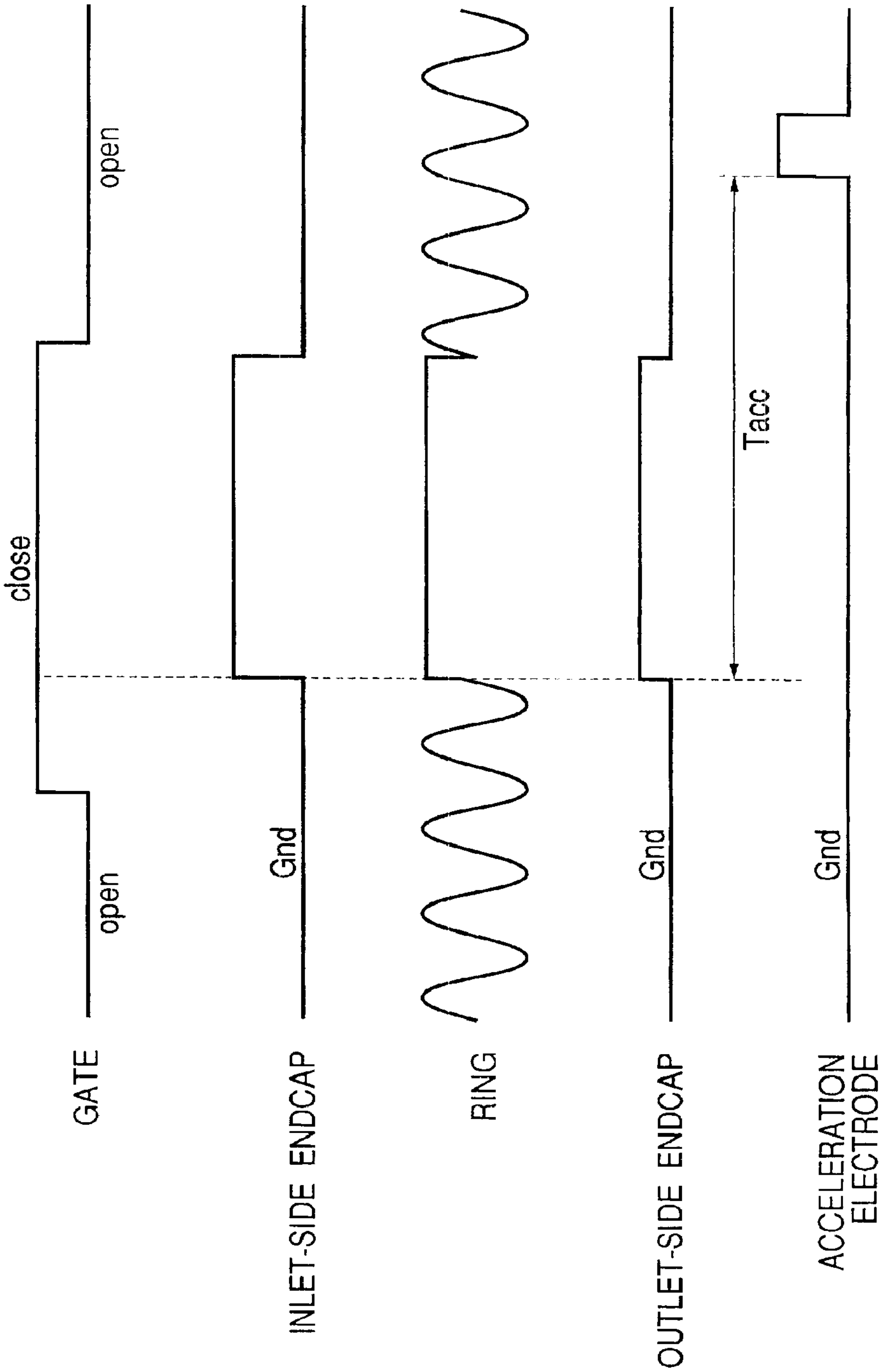
FIG. 2 shows the voltage sequence in a mass spectrometer according to the invention.

FIG. 2 shows the voltage sequence applied to the respective electrodes in carrying out ordinary MS analysis. After ion ejection from the ion trap, the voltage of each electrode in the ion trap is switched from the DC voltage for acceleration electric field formation to a voltage for forming a quadrupole electric field. Immediately thereafter (after about 1 $\mu$s), the gate voltage is changed to restart ion injection into the ion trap. Thereafter, an acceleration voltage pulse is applied to the orthogonal accelerator. The pulse width of the acceleration voltage pulse is set at a level somewhat longer than the time required for all ions occurring in the acceleration region to enter the drift space. This time depends on the range of mass-to-charge ratios of ions occurring in the acceleration region. This mass-to-charge ratio range (hereinafter, "mass window") depends on the time from just after acceleration electric field formation in the ion trap to the application of the acceleration voltage pulse (Tacc in the figure).

The mass window is selected by a technician or operator and is input through the keyboard of a computer. The ratio Mmax/Mmin between the maximum value Mmax and the minimum value Mmin of the mass window does not depend on Vtrap; but rather is constant. Therefore, the operator need only input Mmin (or Mmax) alone. Alternatively, a system may be employed in which a plurality of appropriate mass windows are prepared in advance, for example, on the display of a personal computer, and the operator selects one of these mass windows. The timing of acceleration pulse application and the acceleration pulse width are preferably automatically calculated by software.

Generally, mass spectrometry is repeated about 10 to 1,000 times to obtain an integrated spectrum. Thereafter, the peak showing the highest intensity is selected from among the MS spectrum thus obtained, and MS/MS analysis is performed. This selection is preferably automatically made by software. In MS/MS analysis, like in the case of MS analysis, ions are accumulated in the ion trap. Then, ions other than the ion corresponding to the selected ion (called the "parent ion") are discharged from the ion trap, and the parent ion is decomposed by CID. Some of all of the fragment ions (called "daughter ions") formed upon decomposition of the parent ion are entrapped and accumulated in the ion trap. Then, the daughter ions are ejected from the ion trap using the same sequence as that shown in FIG. 2 and subjected to TOFMS analysis.

Generally, the above sequence is repeated about 10 to 100 times and the MS/MS spectral data obtained are stored in a recording medium. After completion of analysis of the sample solution, the MS/MS spectra are integrated, and the molecular weight of each daughter ion is calculated. For the ESI method, which, in particular, tends to allow the formation of multivalent ions, it is first necessary to determine the valence of each ion. Since a protein contains a large number of carbon atoms, the valence of a fragment ion can be determined based on the distance between isotope peaks due to stable carbon isotopes. The average molecular weight of each daughter ion is then determined based upon the isotope peak intensity ratios and the valence. By checking the molecular weight obtained against a database 61 (FIG. 10), the original protein is identified.

A peak showing the second highest intensity is the selected from among the MS spectrum and subjected to MS/MS analysis in the same manner. Thereafter, MS/MS analysis is performed upon successively decreasing peaks until the peak with the nth highest intensity is analyzed. Generally, n is approximately 1 to 5 and is selected in advance by the measuring personnel. The above series of measurements is repeated on a mass spectrometer until completion of the analysis of the sample solution.

Generally, one MS spectrometric measurement and one MS/MS spectrometric measurement require 0.1 to several seconds, respectively, and one series of measurements requires several to scores of seconds in total. On the other hand, each peptide fragment eluted from an LC is introduced into the mass spectrometer for scores of seconds to several minutes. Therefore, the series of measurement is repeated several times to scores of times for each peptide fragment.

Figure 3:
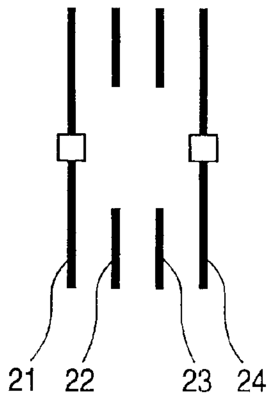
FIG. 3 shows the constitution of a plane electrode type quadrupole ion trap adequate for use in the practice of invention.

In FIG. 3, there is shown the construction of a quadrupole ion trap suited for use in the mass spectrometer of the present invention. The ion trap is comprised of four parallel plate electrodes 21 to 24. The two terminal ones are endcap electrodes 21 and 24, and the intermediate two are ring electrodes 22 and 23. For accumulating ions, the same high-frequency voltage, identical in amplitude, frequency and phase, is applied to the two ring electrodes 22 and 23, while the two endcap electrodes are grounded. For ejecting ions, an appropriate DC voltage is applied to the four electrodes to thereby form an acceleration electric field. The use of a plane quadrupole ion trap enables the formation of a uniform acceleration electric field and is advantageous in that: (1) the ion beam spreading is slight; (2) the control of the space focal plane by two-stage acceleration is easy; and (3) the spatial focusing effect is also good. By disposing the space focal plane by two-stage acceleration at the detection site or in the vicinity thereof, it becomes possible to reduce the spreading of ions within the detection plane and suppress the detection sensitivity from decreasing in the terminal portions of the mass-to-charge ratio range.

Resonance emission is utilized as a means for discharging unnecessary ions other than the parent ion from the ion trap. In effecting resonance emission, an AC voltage with a frequency of f is applied between a pair of endcap electrodes. On that occasion, the trajectory of ions having an m/z corresponding to the frequency f is rapidly expanded and the ions are discharged from the ion trap. When scanning is carried out with this frequency f in a predetermined frequency range exclusive of the vicinity of the frequency f0 corresponding to the m/z of the parent ion, ions other than the parent ion are discharged from the ion trap. This resonance emission may also be effected simultaneously with the entrapment and accumulation of ions in the ion trap. In this case, the accumulation of ions and the discharging of unnecessary ions are carried out simultaneously, such that the cycle of repetition of analysis is shortened and, as a result, the sensitivity is improved.

It is also possible to discharge unnecessary ions by applying desired frequency components other than the frequency f0 and the vicinity thereof simultaneously in an overlapping manner, rather than by scanning with the frequency f. When this technique is employed, no frequency scanning is necessary; hence, the time required for discharging unnecessary ions may advantageously be curtailed. Other methods, for example a method comprising applying a DC voltage with a high-frequency voltage in an overlapping manner to a ring electrode, can also be used for eliminating unnecessary ions. This method, however, is complicated in voltage control, and the method utilizing resonance emission is more practical.

Figure 4:
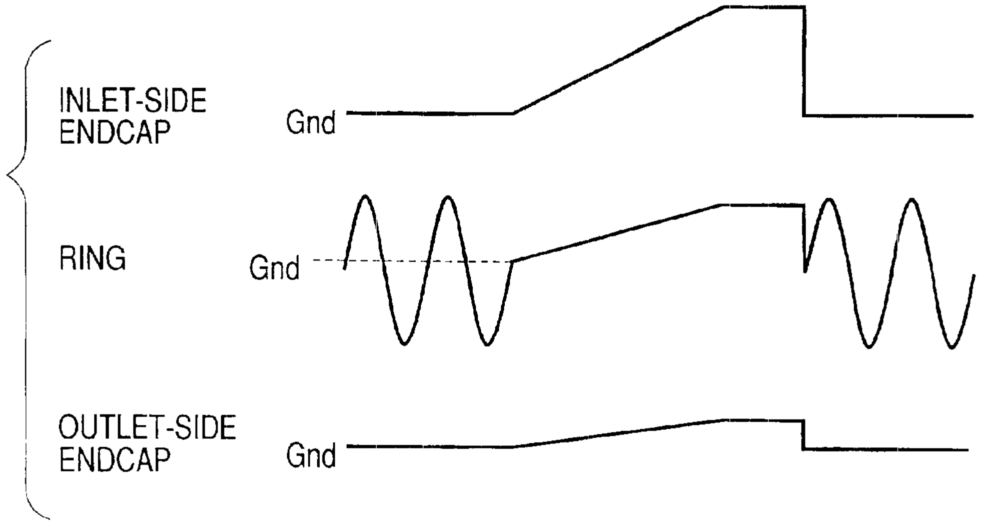
FIG. 4 shows a first method of ion trap control by which the ion velocity distribution may be reduced.

In FIG. 4, an example of the ion trap controlling method by which the ion velocity distribution can be reduced is shown. After ion accumulation in the ion trap, the high frequency voltage application is discontinued, and a DC voltage then is applied to two endcap electrodes and a ring electrode to form an accelerating electric field within the ion trap. On that occasion, each electrode potential is gradually varied from the ground potential level such that the gradient of the accelerating electric field may be increased. The gradual change in electrode potential is effected by means of a voltage scanning circuit adapted to the DC power supply. When the maximum voltage value (absolute value) and the time required for reaching that maximum voltage value are set up, the voltage scanning circuit can realize arbitrary voltage scanning.

When ions are ejected by means of a constant accelerating electric field, the kinetic energy of ions ejected from the ion trap is constant. The velocity v of an ion ejected is defined by $v=\sqrt{(2(z/M)eV)}$. Here, M is the mass of the ion, and V is the potential in the central portion of the ion trap. Thus, when the accelerating electric field is increased, the kinetic energy of an ion ejected increases with the increase in m/z. Therefore, when the m/z has a larger value, V in the above velocity formula is also larger. By adequately selecting the increment in accelerating electric field and the increasing velocity, it is possible to expand the mass-to-charge ratio range that may be analyzed at a single time and, at the same time, reduce the size of the detector.

Figure 5A:
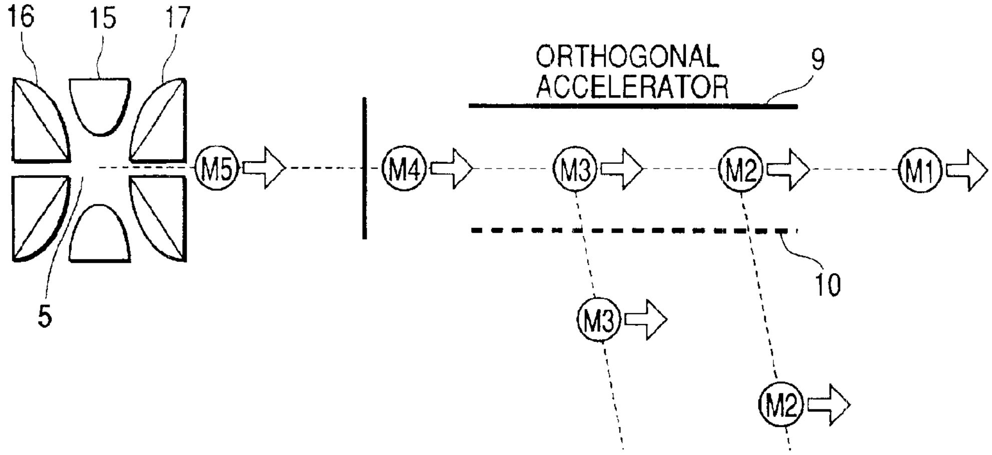
FIG. 5 schematically shows the mass-to-charge ratio range increasing effect which may be produced by reducing the ion velocity distribution.
Figure 5B:
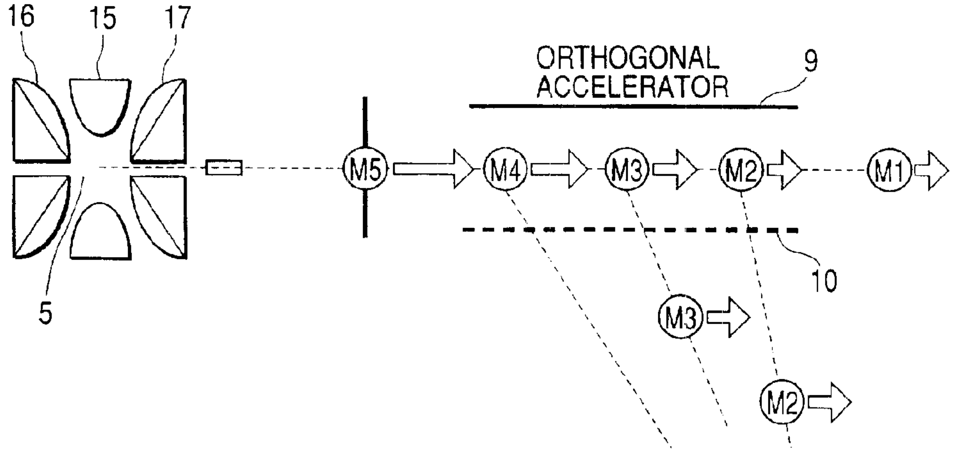

In FIG. 5, there are schematically shown ion trajectories for (a) a case where the accelerating electric field is not increased and (b) a case where the acceleration electric field is increased appropriately. The same effect can also be achieved by increasing the accelerating electric field stepwise.

Figure 6:
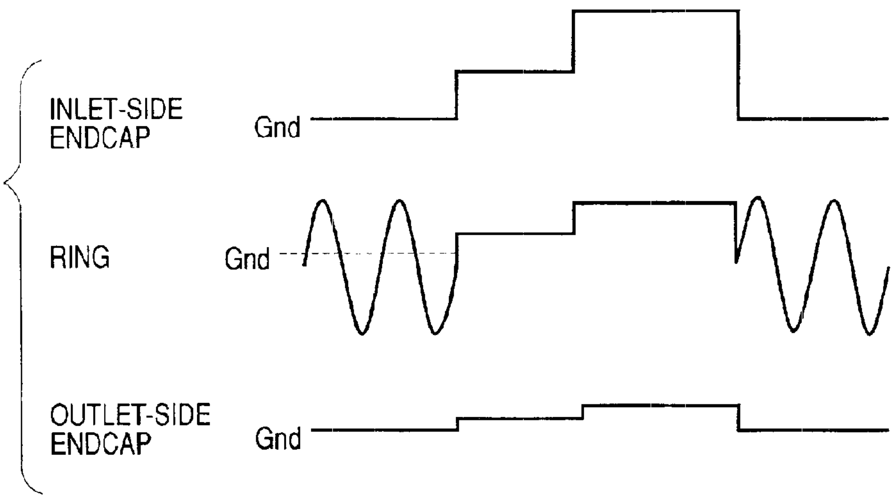
FIG. 6 shows a second method of ion trap control by which the ion velocity distribution may be reduced.

FIG. 6 shows an ion trap controlling method by which the accelerating electric field is increased stepwise. The method comprising a stepwise increase in the accelerating electric field is advantageous in that the spatial spreading of ions due to the turnaround time can be suppressed.

Figure 7:
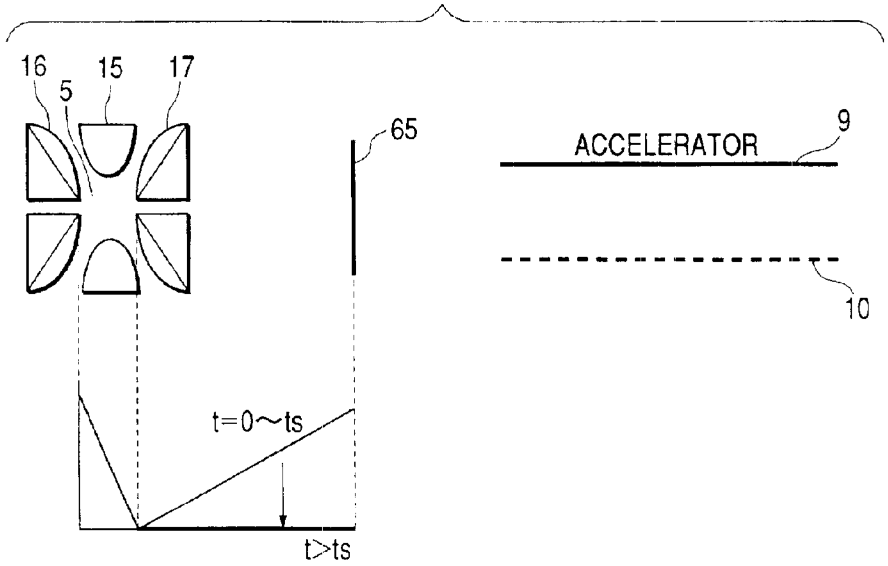
FIG. 7 shows the constitution of an electrode constitution and a method of controlling the same by which the ion velocity distribution may be reduced.

FIG. 7 shows an example of apparatus construction and of the controlling method by which the velocity distribution of ions can be reduced. An electrode 65 is disposed between the ion trap 5 and orthogonal accelerator 18. The electrode 65 is generally set at a potential such that a decelerating electric field is formed between it and the ion trap outlet side. The RF voltage application to the ring electrode 15 is discontinued, and an accelerating electric field is formed within the ion trap 5 to eject the ions accumulated in the ion trap. While ions are ejected and pass through the decelerating electric field, the potential of the electrode 65 either: (a) decreases the gradient of the decelerating electric field; (b) causes the decelerating electric field to disappear; or (c) forms an accelerating electric field, as shown in the figure. By optimizing the change in decelerating electric field and the timing of changing, the same effect as that shown in FIG. 5 can be achieved. The optimizing conditions are formularized and stored in the software for measurement, and the measuring operator may only be required to designate the minimum mass (or maximum mass).

Figure 8A:
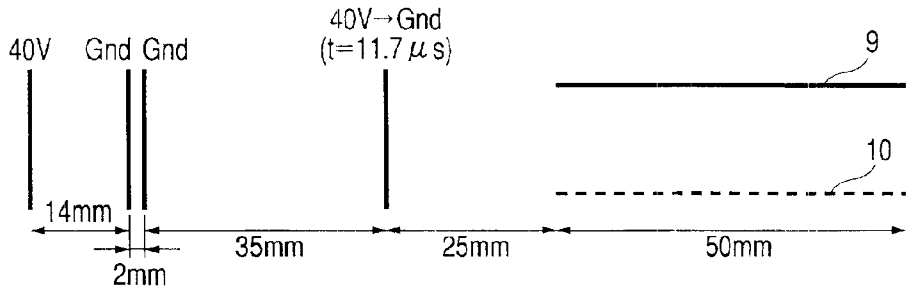
FIG. 8 shows the results of calculation indicating the mass-to-charge ratio range increasing effect.
Figure 8B:
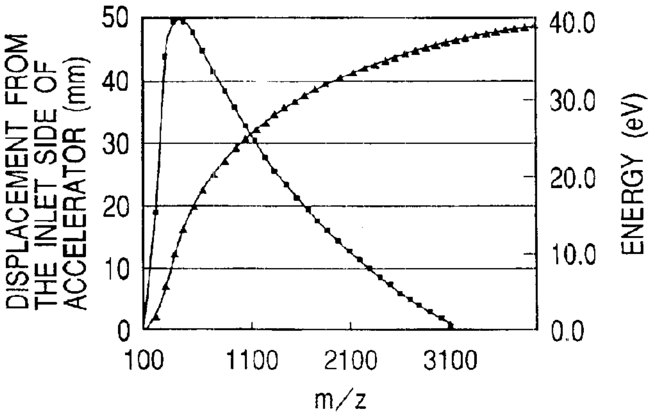
Figure 8C:
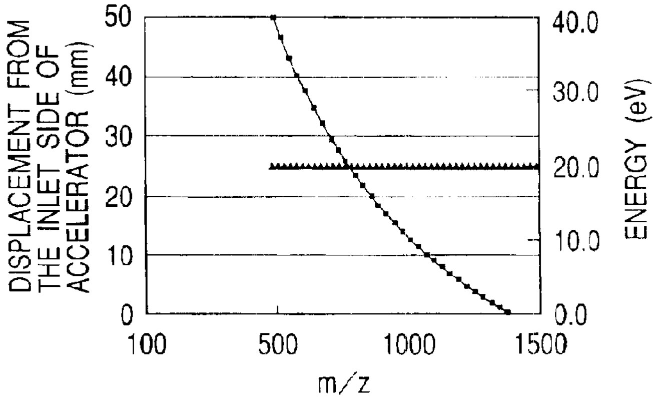

FIG. 8 shows, as an example, the results of calculation concerning the mass-to-charge ratio range enlarging effect of the above-mentioned method. The electrode construction and voltage controlling method are as shown in FIG. 8(*a*). The ion trap used is of the plate type, and the multi-stage acceleration method is used for optimizing the space focal plane. An electrode is disposed behind the outlet of the multi-stage accelerator to form a decelerating electric field between the multi-stage accelerator outlet (ground potential) and the electrode, and the decelerating electric field is caused to disappear at a certain timing during passage of the ions therethrough by changing the electrode potential to the ground potential.

The calculation results shown in FIG. 8(*b*) are for the case where the present method is used, and those shown in FIG. 8(*c*) are for the case where the present method is not used, namely the case where the electrode is always at ground potential. In each graph, the first ordinate axis denotes the position of ions at the time of acceleration pulse application to the orthogonal accelerator. Here, the position 0 mm corresponds to the accelerator inlet, and the position 50 mm to the accelerator outlet. From the figures, it is seen that when the present method is used, ions with m/z 500 to 3,100 occur in the acceleration region at the time point of acceleration pulse application. The ratio between maximum mass and minimum mass (Mmax/Mmin) is 6.2. On the other hand, when this method is not used, ions with m/z 600 to 1,600 occur in the acceleration region, and the ratio Mmax/Mmin is 2.7. Thus, the mass window is about 2.3-fold enlarged with the present method.

In each graph, the second ordinate axis denotes the kinetic energy of ions in the orthogonal accelerator. Using the position and kinetic energy obtained by this calculation as initial conditions, the ion trajectories in the TOF segment may be calculated using the ion trajectory analysis software "SIMION," whereupon it is revealed that the spatial distribution of ions on the detection face of the detector is within 13 mm when the present method is used. When this method is not used, the spatial distribution on the detection face is equal to the length of the acceleration region, as mentioned above, namely 50 mm. Thus, the size of the detector can be reduced to about one third its conventional size.

As an alternative to this method, a method comprising changing the potential of the endcap electrode on the outlet side of the ion trap during passage of ions between the endcap on the outlet side and the electrode may be used to produce the same effect. Alternatively, the potentials of both the outlet side endcap and the electrode may be changed. In summary, the only requirement is to change the electric field between both the electrodes such that the ratio in kinetic energy between preceding ions and succeeding ions among the ions flying between both the electrodes can be reduced. For reducing the dispersion of the ion beam, however, the method comprising decelerating preceding ions is preferred to the method comprising accelerating succeeding ions.

This method is also effective in an orthogonal acceleration type TOFMS in which a linear trap (two-dimensional ion trap) is used. The means for reducing the velocity distribution of ions may also utilize a magnetic field, rather than an electric field.

As the means for ejecting ions from the ion trap, the method which comprises discontinuing RF voltage application for ion accumulation and then forming an accelerating electric field within the ion trap is preferably used. When an accelerating electric field is formed while applying an RF voltage, the spatial distribution of ions within the ion trap, the kinetic energy distribution for the ions within the ion trap, and the spatial dispersion of ions in the acceleration region due to impact scattering by collision with neutral gas molecules increases. When the present method is used, no such increasing effects are produced.

Ions within the ion trap show spatial distribution to a certain extent, such that even when the above-mentioned ion ejecting means is provided, the ions differ in initial potential at the time of ejection owing to their differing initial positions. Ions on the remote side from the outlet are ejected later than the ions on the close side to the outlet. Because, however, the velocity of the former ions is higher as compared with the ions on the close side to the outlet, the former overtake the latter at a certain position. This position is called the "space focal plane". By forming an electric field for accelerating ions in the direction of movement thereof between the ion trap outlet to the orthogonal accelerator, it is possible to adjust the position of the space focal plane according to the well-known principle of multi-stage acceleration. By optimizing the position of the space focal plane according to this principle, it becomes possible to improve the efficiency of detection of ions occurring in the acceleration region terminus.

Second Exemplary Embodiment

Figure 9:
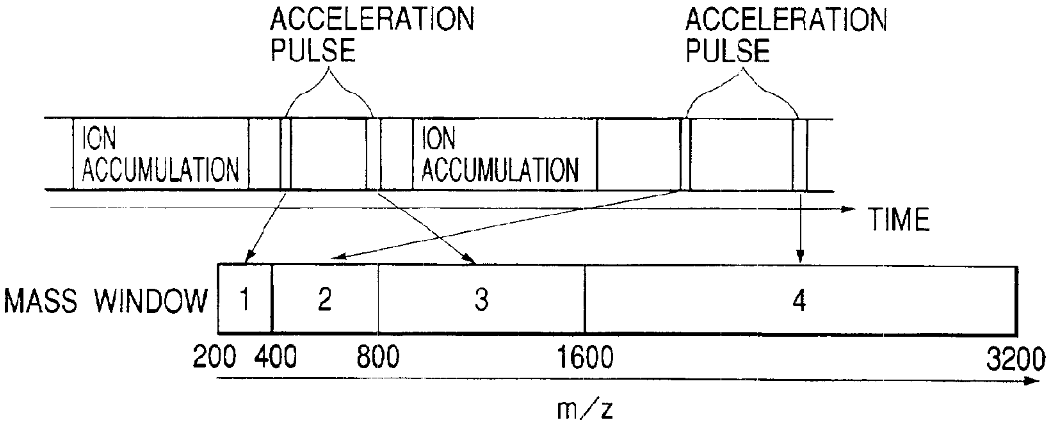
FIG. 9 illustrates the segment method according to the invention.

FIG. 9 shows an example of the analytical sequence using the segment method according to the present invention. In the segment method, a mass-to-charge ratio range to be analyzed is divided into several segments. In the example shown here, an m/z range of 200 to 3,200 is analyzed using an apparatus with Mmax/Mmin=2. In this case, the whole mass-to-charge ratio range is divided into 200 to 400 (mass window 1), 400 to 800 (mass window 2), 800 to 1,600 (mass window 3) and 1,600 to 3,200 (mass window 4). Considering the sensitivity decrease at the end portions of each mass window, the respective neighboring mass windows are terminally overlapped to an appropriate extent. In joining the mass spectra together, the spectrum higher in intensity is selected out of the two spectra of the respective windows in each overlapping mass range.

Initially, ions are accumulated in the ion trap, the ions are then ejected from the ion trap, and an acceleration pulse is applied for analyzing the mass window 1. A second acceleration pulse is then applied for analyzing the mass window 3. Thereafter, ions are accumulated again, and mass windows 2 and 4 are analyzed in the same manner. When the number of mass windows is larger, the whole range can be analyzed by two periods of ion accumulation while increasing the number of acceleration pulses to be applied following each time of ion accumulation. The measuring person is required only to select the mass-to-charge ratio range to be analyzed. The mass window setting and the timing of each acceleration pulse application are automatically determined or calculated by the appropriate software.

Since the possibility of daughter ion peaks overlapping with the parent ion peak is low, the necessity of analyzing the region close to the parent ion peak is not great. In the ion trap, daughter ions having not higher than ⅓ or not lower than 3 in m/z ratio to the parent ion are not accumulated. Therefore, when an apparatus with Mmax/Mmin= approximately 3 is used, it is sufficient to analyze two regions lower and higher than the parent ion peak, excluding the vicinity of that peak following one ion accumulation process.

Third Exemplary Embodiment

Figure 10:
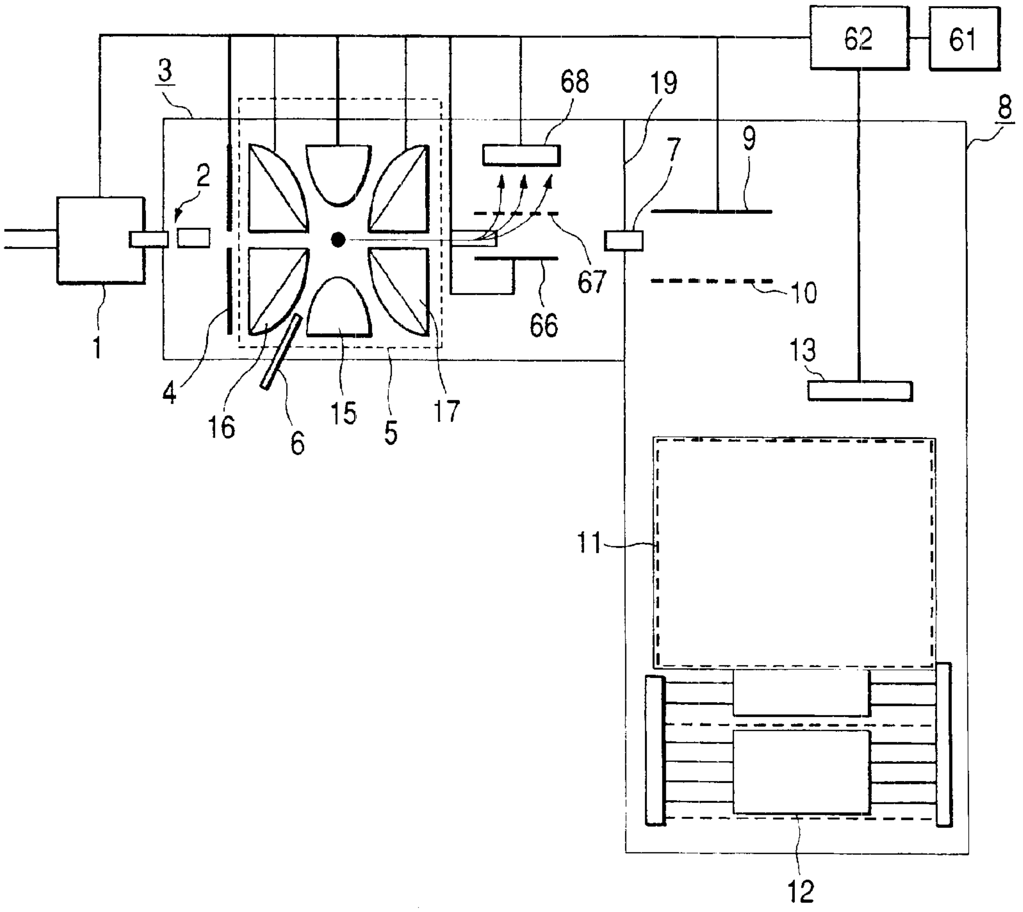
FIG. 10 shows the constitution of a hybrid apparatus according to the invention.

FIG. 10 shows a hybrid apparatus according to the invention comprised of an ion trap type mass spectrometer and an ion trap-connected time-of-flight mass spectrometer of the orthogonal acceleration type. This apparatus is constructed by disposing a detector 68 for detecting ions deflected by deflection electrodes 66 and 67 in the ion trap-connected time-of-flight mass spectrometer of the orthogonal acceleration type. In ion trap mass spectrometry, a mass spectrum is obtained by scanning with a high frequency voltage amplitude to discharge ions from the ion trap in an increasing order of m/z, and detecting the same. In this hybrid apparatus, a potential difference is given between the two deflection electrodes and scanning is made with a high frequency voltage, and the ions discharged are deflected and directed to the detector. Out of the two deflection electrodes, the one through which ions pass is in a mesh-like form. It is also possible to deflect ions by providing a potential difference between the other electrode and the plane of incidence of the detector in lieu of the use of the mesh-like electrode. This detector may also be disposed behind the orthogonal accelerator. In this case, the deflection electrodes 66, 67 are no longer necessary, and the apparatus construction is simplified. However, the sensitivity is sacrificed due to the occurrence of a pinhole in the middle of the route of ions.

The amplitude of the high frequency voltage is then fixed at an appropriate value, and the ions remaining in the ion trap are stabilized for about 0 to 10 ms, during which the function of the deflection electrodes is ceased. Thereafter, TOFMS analysis is performed. Even with an apparatus with Mmax/Mmin=approximately 2, this method makes it possible to analyze an m/z range as wide as 100 to 3,000 by one ion accumulation procedure by, for example, analyzing the m/z range of 100 to 1,500 by ion trap mass spectrometry and analyzing the m/z range of 1,500 to 3,000 by the TOFMS. This method may be combined with the method of enlarging the mass windows by reducing the velocity distribution of ions and, by this combination, a broader mass-to-charge ratio range can be measured with high resolution.

In proteome analysis using the shotgun method, a higher level of mass resolution is more advantageous in determining the valences of daughter ions. When, however, the parent ion is selected, such resolution power as for daughter ions is not necessary, but rather, the detection sensitivity is more important. Generally, MS/MS measurements can attain higher sensitivity as compared with MS measurements. The reasons for this include: in MS/MS measurements, ion accumulation conditions can be selected solely for the target parent ion; that other ions and chemical noises can be markedly reduced in the process of isolation; and that decomposition of the parent ion to lower molecular weight compounds results in a decrease in the number of isotope peaks and an increase in peak intensity per peak. When the ITMS and orthogonal acceleration type IT-TOFMS are compared, the ITMS is higher in sensitivity in some cases according to the measurement conditions and apparatus constitution. When this hybrid apparatus is used, it is possible to use the ITMS for MS spectrum measurements and the TOFMS for MS/MS spectrum measurements. The parent ion selection efficiency is thereby improved and, as a result, the protein identification efficiency is improved.

Fourth Exemplary Embodiment

Figure 11:
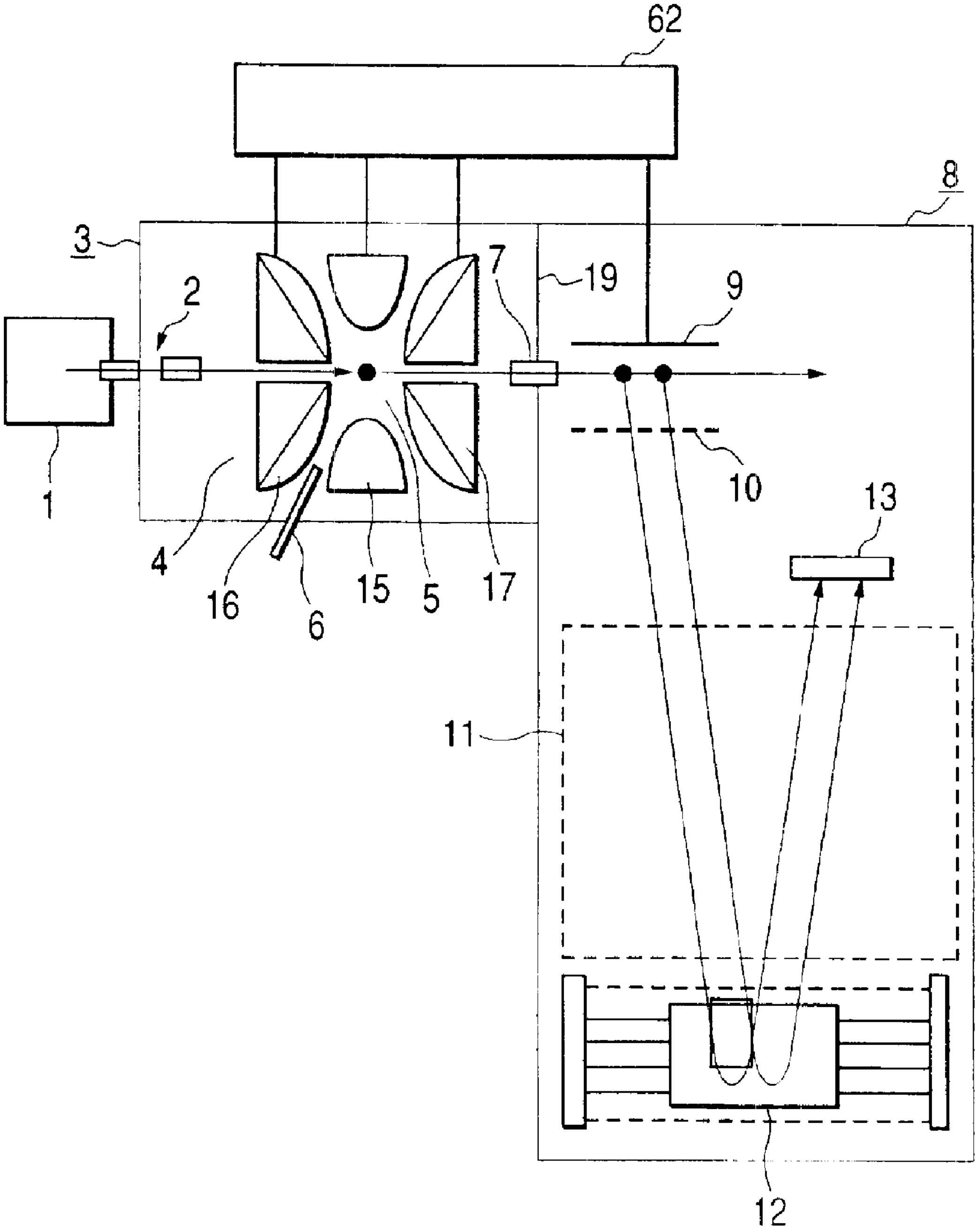
FIG. 11 shows the constitution of another mass spectrometer according to the present invention.

In FIG. 11, another example is shown of the construction of a mass spectrometer according to the present invention. Ions formed in the ion source are introduced into a quadrupole ion trap disposed in a first vacuum region 3 within a vacuum system. The ions are trapped and accumulated in the ion trap for a certain period of time and then ejected from the ion trap. The ions ejected pass through a pinhole 7 and enter a second vacuum region 8 in which a time-of-flight measuring device is disposed. An orthogonal accelerator is disposed in the second vacuum region 8 and can form an electric field for accelerating the ions after passage through the pinhole 7 in the direction orthogonal to the axial direction of the ion trap (direction of ejection of ions). Initially, no electric field is formed in the orthogonal accelerator and, while the ions to be detected are passing through the orthogonal accelerator, a pulse voltage is applied to form an accelerating electric field.

Based on the time of flight of an accelerated ion until arrival at the detector 13, the ratio m/z of the ion can be determined. Since an inert gas (e.g., helium or argon) has been introduced into the ion trap inside for the purpose of increasing the trapping efficiency, the degree of vacuum within the ion trap is about 1 mTorr, and the degree of vacuum outside the ion trap but within the first vacuum region 3 is about 10 $\mu$Torr. The first vacuum region 3 and second vacuum region 8 are separated from each other by a partition wall having only a pinhole 7 with a diameter of about 1 to 2 mm, and are under high vacuum (about 0.1 $\mu$Torr). Since the accelerator is disposed in such a high vacuum region of about 0.1 $\mu$Torr, ions rarely collide with neutral gas molecules during acceleration or after acceleration until arrival at the detector. A high level of resolution can thus be realized.

The ions ejected from the ion traps arrive at the orthogonal accelerator in an increasing order of m/z thereof, such that only those ions passing through the accelerator at the time of pulse voltage application to the orthogonal accelerator are detected. However, in the present apparatus, ions can be focused, by using a quadrupole ion trap, in a very narrow region (for example, not more than about 1 mm in diameter) in the central portion of the ion trap, so that the spatial distribution of ions having the same m/z in the axial direction in the orthogonal accelerator is narrow; the apparatus is thus characterized in that the detection sensitivity thereof is high as to ions to be detected.

Fifth Exemplary Embodiment

While in the first exemplary embodiment the ion velocity distribution is narrowed by switching the voltage polarity applied to the ring electrode and endcap electrodes disposed in the ion trap from alternating to direct, the same effect can be produced by disposing the means for reducing the ion velocity distribution outside the ion trap. Thus, the ion velocity distribution reducing effect can be produced by disposing, outside the ion trap, parallel electrodes connected to a DC current power supply and applying a DC voltage to ions ejected from the ion trap.

By enlarging the mass-to-charge ratio range analyzable per ion accumulation in an ion trap-connected time-of-flight mass spectrometer of the orthogonal acceleration type as an MSn apparatus with high resolution and high sensitivity, the practicability thereof in proteome analysis is improved and, as a result, the efficiency of protein identification is improved.

Nothing in the above description is meant to limit the present invention to any specific materials, geometry, or orientation of parts. Many part/orientation substitutions are contemplated within the scope of the present invention. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A mass spectrometer, comprising:

an ion source;

an ion trap for accumulating the ions formed in said ion source and ejecting the same, said ion trap comprising a ring electrode and endcap electrodes;

a voltage applying means for applying a voltage, in a transverse direction relative to the direction of ion ejection, to ions ejected from said ion trap in the axial direction of said ion trap;

a third electrode which is disposed between the ion trap and said voltage applying means and to which a voltage is applied to form a decelerating electric field between an outside of said ion trap and said third electrode;

a detector for detecting the ions to which the voltage has been applied in the transverse direction, wherein an accelerating electric field is formed within said ion trap to eject the ions accumulated in said ion tray after termination of AC voltage application to said ring electrode, and the gradient of said decelerating electric field is decreased, during passage of the ions between said endcap electrode on an outlet side of said ion trap and said third electrode, by changing the potential of said third electrode or said endcap electrode on the outlet side of said ion trap such that a ratio in kinetic energy between preceding ions ejected and succeeding ions ejected between said ion trap and said first electrode is reduced.

2. A mass spectrometer according to claim 1, wherein the succeeding ions elected are decelerated to reduce a dispersion of an ion beam.

3. A mass spectrometer comprising:

an ion source;

an ion trap for accumulating the ions formed in said ion source and ejecting the same, said ion trap comprising a ring electrode and endcap electrodes;

a voltage applying means for applying a voltage, in a transverse direction relative to the direction of ion ejection, to ions ejected from said ion trap;

a detector for detecting the ions to which the voltage has been applied in the transverse direction;

means for applying an alternating current (AC) voltage and a direct current (DC) voltage to said ion trap; and a controller for controlling the order of applying said AC voltage and DC voltage, said controller allowing AC voltage application to said ring electrode and, after termination of the AC voltage application for ion accumulation in said ion trap, allowing different DC voltage application to said ring electrode and said endcap electrodes, wherein said different DC voltage is applied to said ring electrode and said endcap electrodes by a voltage scanning to form an accelerating electric field in said ion trap, such that the accelerating electric field increases during the period until ions are ejected from said ion trap and the kinetic energy of the ions from said ion trap increases with the increase in m/z.

4. A mass spectrometer according to claim 3, wherein said DC voltage is increased stepwise.

5. A mass spectrometer according to claim 3, wherein said DC voltage is ramped.

6. A mass spectrometer, comprising:

an ion source;

an ion trap for trapping the ions formed in said ion source;

means for discharging part of the trapped ions from said ion trap in order of increasing mass-to-charge ratio;

means for ejecting the trapped ions from said ion trap;

a deflection means for deflecting ions ejected from said ion trap;

a first detector for detecting the deflected ions by said deflection means;

means for applying a voltage, in the transverse direction relative to the direction of ion ejection, to the ions ejected from said ion trap; and a second detector for detecting the ions to which the voltage has been applied in the transverse direction, wherein said first detector is disposed between said ion trap and the means for applying a voltage.

7. A mass spectrometer comprising:

an ion source;

an ion trap for accumulating the ions formed in said ion source and ejecting the same;

means for controlling the timing of ion ejection from said ion trap;

a voltage applying means for applying a voltage, in a transverse direction relative to the direction of ion ejection, to the ions ejected from said ion trap;

a controller for interlocking said voltage applying means with said means for controlling the timing of ion ejection, said controller determining the period between the timing of starting ion ejection and the timing of starting the operation of said voltage applying means, according to the range of mass-to-charge ratios of the ions to be identified; and a detector for detecting the ions to which the voltage has been applied in the transverse direction, wherein said controller causes said voltage applying means to apply the transverse voltage a plurality of times for the ion ejection following each time of the ion accumulation in said ion trap so that multiple mass-to-charge ratio ranges can be analyzed.

8. A mass spectrometer according to claim 7, wherein the ion ejection and application of a plurality of transverse voltages are repeated and the timing of application of said plurality of transverse voltages differs per each repeated ion ejection.

9. A mass spectrometer according to claim 7, wherein said controller determines the period between the timing of starting ion ejection and the timing of starting the operation of the voltage applying means such that each mass-to-charge ratio region for ion detection may partly overlap with the preceding one and/or succeeding one per application of the transverse voltage.

10. A measurement system, comprising:

a liquid chromatograph; and a mass spectrometer comprising an ion source, an ion trap for accumulating the ions formed in said ion source and ejecting the same, said ion trap comprising a ring electrode and endcap electrodes, a voltage applying means for applying a voltage, in a transverse direction relative to the direction of ion ejection, to ions ejected from said ion trap in the axial direction of said ion trap;

a third electrode which is disposed between the ion trap and said voltage applying means and to which a voltage is applied to form a decelerating electric field between an outside of said ion trap and said third electrode;

a detector for detecting the ions to which the voltage has been applied in the transverse direction, wherein an accelerating electric field is formed within said ion trap to eject the ions accumulated in said ion trap after termination of AC voltage application to said ring electrode, and the gradient of said decelerating electric field is decreased, during passage of the ions between said endcap electrode on an outlet side of said ion trap and said third electrode, by changing the potential of said third electrode or said endcap electrode on the outlet side of said ion trap such that a ratio in kinetic energy between preceding ions ejected and succeeding ions ejected between said ion trap and said third electrode is reduced.

* * * * *